United States Patent [19]

Ziemek

[11] Patent Number: 4,558,736
[45] Date of Patent: Dec. 17, 1985

[54] HEAT EXCHANGER, PARTICULARLY FOR SOLAR COLLECTORS AND METHOD OF MANUFACTURE THEREFOR

[75] Inventor: Gerhard Ziemek, Langenhagen, Fed. Rep. of Germany

[73] Assignee: Kabelmetal Electro Gesellschaft mit beschränkter Haftung, Hanover, Fed. Rep. of Germany

[21] Appl. No.: 501,739

[22] Filed: Jun. 6, 1983

[30] Foreign Application Priority Data

Oct. 21, 1982 [DE] Fed. Rep. of Germany ....... 3238943

[51] Int. Cl.⁴ .............................. F28F 1/14; F24J 3/02
[52] U.S. Cl. ................................ 165/183; 29/157.3 C; 126/446; 126/449
[58] Field of Search ............... 165/183, 171, 182, 181; 29/157.3 C; 126/446, 449

[56] References Cited

U.S. PATENT DOCUMENTS

| 2,245,069 | 6/1941 | Clarke | 165/181 |
| 4,326,583 | 4/1982 | Rudd | 165/183 |
| 4,426,995 | 1/1984 | Wilson | 126/426 |
| 4,465,061 | 8/1984 | McMurtrie | 126/449 |

FOREIGN PATENT DOCUMENTS

| 2426218 | 1/1980 | France | 126/449 |
| 584386 | 1/1977 | Switzerland | 126/271 |

Primary Examiner—Harry Tanner
Attorney, Agent, or Firm—Martin A. Farber

[57] ABSTRACT

For a heat exchanger, particularly for solar collectors, a metal plate is continuously longitudinally welded to a metal tube centrally between the longitudinal edges of the plate. The width of the metal plate is greater than the outer diameter or cross sectional dimension of the tube and the metal plate is plastically deformed in deformation areas on both longitudinal sides so as to increase its surface in these respective areas between its longitudinal edges and short of the longitudinal line of welding contact with the tube. An undeformed region extends in the longitudinal direction of the tube between the deformation areas. The plastic deformations are of dimple shape, and preferably spherical, which improves the absorption of radiation.

16 Claims, 5 Drawing Figures

HEAT EXCHANGER, PARTICULARLY FOR SOLAR COLLECTORS AND METHOD OF MANUFACTURE THEREFOR

BACKGROUND OF THE INVENTION AND THE PRIOR ART

The present invention relates to a heat exchanger element in general, and, particularly for solar collectors, comprising a metal plate welded centrally between its longitudinal edges to a metal tube, the width of the metal plate being greater than the cross sectional dimension of the tube and the metal plate being plastically deformed so as to increase its surface in regions between its longitudinal edges and its line of contact with the tube, while an undeformed region extends in the longitudinal direction of the tube between the deformation regions, and to a method for production of such a heat exchanger.

Solar collectors as an alternative source of energy for regions of abundant sunlight are becoming more and more important, particularly since they receive subsidies and incentives in many countries. Various solar collectors are known with a type of action based on the hot-house effect.

The core of all solar collectors of this type is the heat exchanger or heat exchange element which transfers the collected heat to a heat-carrier or heat exchanger fluid.

Heat exchangers have already been proposed which are made of a metal tube to which a metal plate is tangentially welded. The metal plate acts to increase the surface of the tube and transfers the collected heat energy to the tube and consequently to the heat exchanger fluid flowing within the tube. The optimization of a solar collector has as its purposes:
1. Optimization from a heat engineering standpoint;
2. Optimization from a mechanical standpoint; and
3. Optimization from a cost standpoint.

Since cost is the decisive factor, it must be attempted to use plates which are as thin as possible. However, they must also be stable in all directions, and must absorb the heat as best as possible and introduce it into the tube. If it is desired to use plates of a thickness of 0.25 mm and less, and particularly plates of a wall thickness from 0.15 to 0.18 mm, the plates can no longer be handled mechanically. They are too delicate to withstand subsequent assembly work without damage.

From U.S. Pat. No. 4,326,583 a heat exchanger for this purpose is known which consists of a metal tube with a metal plate welded to it. In order to prevent distortions due to the welding of the metal plate to the metal tube during or after the cooling of the weld seam, the regions of the metal plate on both sides of the weld seam which are not heated by the welding operation are provided with corrugations which run substantially transverse to the longitudinal direction of the tube. These corrugations are adapted to prevent the occurrence of distortions in the region of the weld seam very well and to increase the rigidity of the metal plate. However, they are still not completely satisfactory from a heat transfer standpoint.

OBJECTIVE OF THE INVENTION

The object of the present invention therefore is to improve the known heat exchanger in such a manner that, with the same rigidity of the metal plate and without having to fear distortions or warping in the region of the weld seam, the heat absorption nevertheless is substantially increased.

SUMMARY OF THE INVENTION

The object of the invention is achieved by formation of the plastic deformations (e.g. 3) in a calotte or dimple shape.

As a result of the dimple-shape deformations, assurance is provided that even with a change in the position of the sun the radiation will always strike perpendicularly onto a large portion of the surface of the metal plate, which, as is known, increases the percentage of absorbed radiation E in accordance with the equation $E = E_N \times \cos \rho$, when $E_N$ is the impinging energy and $\rho$ is the angle of incidence with respect to the vertical.

It is particularly advantageous for the dimple-shaped deformations to be formed extending from both opposite sides of the surface of the plate. This embodiment of the invention, on the one hand, has an advantageous effect on the rigidity while, on the other hand, also serves to increase the heat absorption.

The dimples (3) are preferably shaped in the form of spherical segments. In one optimum formation of the dimples, the depth of the dimples, measured from the undeformed plane of the plate (2), to their maximum points is substantially between 0.1 and 0.7 mm. The radius of curvature of the spherical dimples should be approximately between 0.3 and 4 mm.

A particular uniform deformation of the surface of the metal plate is obtained if the dimples are formed in such number and distribution that a wave or sinusoidal course of the wall of the plate (2) is obtained in a sectional plane which extends through the points of maximum depth or height of the dimples in the longitudinal and/or transverse directions of the tube (1).

The invention furthermore provides a method for the production of a heat exchanger in accordance with the invention in which a continuously fed metal plate is brought towards a continuously fed metal tube, the tube is positioned centrally between the longitudinal edges of the metal strip, and the metal plate is metalurgically attached to the metal tube by TIG (tungsten/inert gas welding) or through-welding, and thereupon the lateral longitudinal regions of the plate located on both sides of the tube are plastically deformed into dimples between a region (a central longitudinal strip) in the vicinity of the tube which remains undeformed and the longitudinal edges of the strip. In this method the heat exchanger element passes through a pair of substantially complementary die shaped rollers, with clearance (shown in FIG. 4) substantially equal to the thickness of the metal plate, which press the plate therebetween and form and thereby apply the dimple-shaped plastic deformations at the lateral longitudinal regions of the plate.

With the above and other objects and advantages in view, the present invention will become more clearly understood in connection with the detailed description of a preferred embodiment, when considered with the accompanying drawings, of which:

Figure 1:
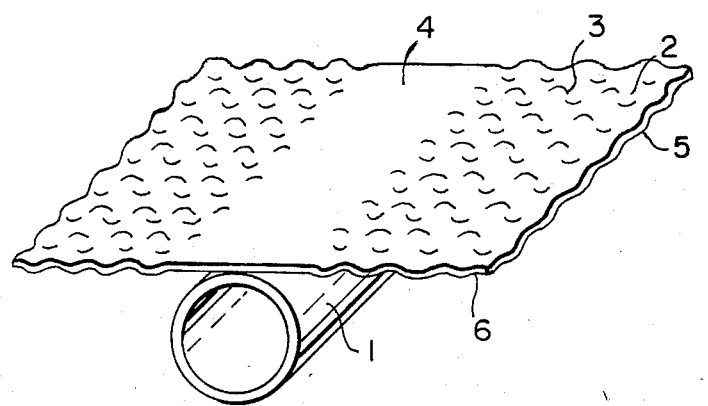
FIG. 1 is a broken-away perspective view of a heat exchanger element incorporating one embodiment of the invention.

Referring now to the drawings, a metal sheet (herein also called a metal or guide plate) 2 fed from a supply roll is tangentially centrally welded, by a welding device 8, to a copper tube 1, preferably a seamless drawn copper tube 1 having, for example, an outside diameter of 12.7 mm and a wall thickness of 0.5 mm. The guide plate 2, which also preferably is made of copper, has for example, a width of 114 mm and a wall thickness of 0.2 mm. By means of pressure rollers 9a, 9b the guide plate 2 is formed with a plurality of uniformly distributed alternately extending embossments or dimples 3, each preferably in the shape of a spherical segment, which alternately extend in opposite directions, raised and recessed, respectively, out of the plane of the metal plate 2. At a longitudinal mid-portion of the guide plate 2 adjacent to and on both sides of the place where the tube 1 is welded to the plate, there remains a longitudinal undeformed region 4, the width of which corresponds approximately to the outside diameter of the tube 1, although not limited thereto. The depth or height of the dimples 3 from the planar surface of the plate is preferably 0.3 mm, the radius of curvature of the spherical dimples being preferably about 3.5 mm. The spacing between two adjacent dimples 3 is between 5 mm and 12 mm, preferably 9 mm. The distance in the longitudinal and transverse directions is the same. These dimensions represent an optimization with respect to heat absorption and stiffening of the relatively thin wall thickness metal plate 2. As a result of the stiffening, handling is possible without damaging the metal plate 2 upon subsequent insertion and assembly into solar collectors. The spherical dimples 3 are provided in such number and distribution as to make the metal plate 2 wave shaped or corrugated in every cross sectional plane through the metal plate 2, and for example also at the longitudinal edge 5 or at the transverse edge 6, respectively. In the illustrated embodiment every cross section through the plate and roller is wave shaped.

By formation of the dimples on the metal plate 2 the advantageous result is obtained that even in the case of obliquely incident radiation there are always regions of the plate at which the heat radiation impinges at an angle of precisely 90°. Since the radiation energy absorbed is dependent on the cosine of the angle of incidence, the amount of energy absorbed in the case of perpendicular impingement is equal to the incident amount of energy. In addition, in the case of an oblique incidence, the incident energy is reflected by the spherically shaped dimples and can thus impinge several times on the surface of the metal. The result of these dimples is that the absorption of energy is substantially greater than that of a flat plate, assuming obliquely incident radiation. It is also greater than that of the heat exchanger of U.S. Pat. No. 4,326,583. However, this is only true when the radiation strikes obliquely at an angle less than or greater than 90° relative to the direction of the corrugation.

Figure 2:
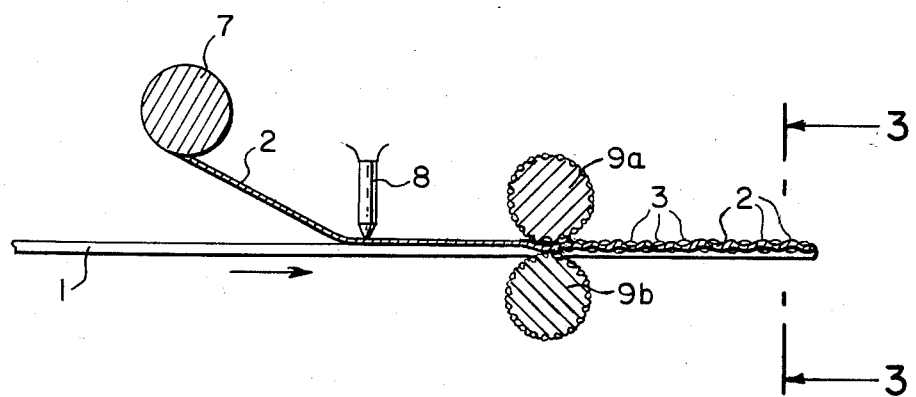
FIG. 2 is a schematic view partly shown in section illustrating a method of the invention for manufacturing the heat exchanger element of FIG. 1.
Figure 5:
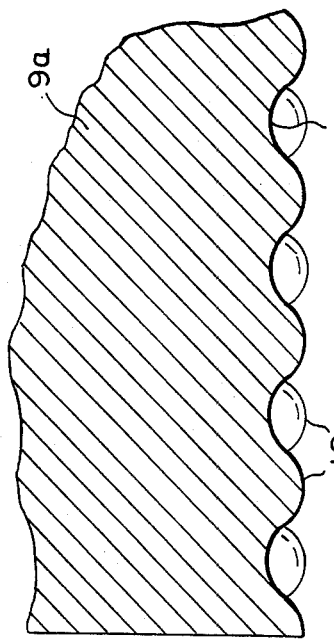
FIG. 5 is a partial section taken along the line 5—5 of FIG. 3.
Figure 4:
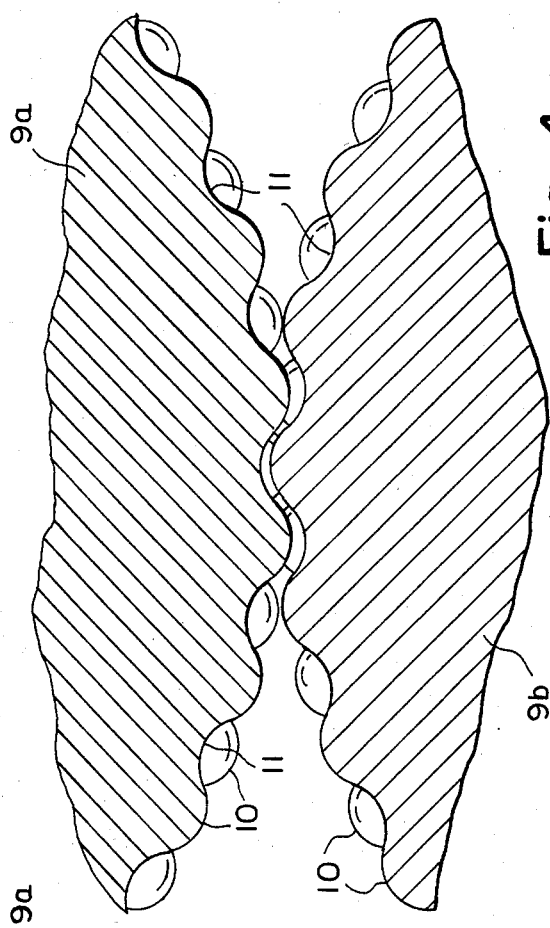
FIG. 4 is a partion section taken along the line 4—4 of FIG. 3, the heat exchanger element which is produced being omitted for purposes of clarity.
Figure 3:
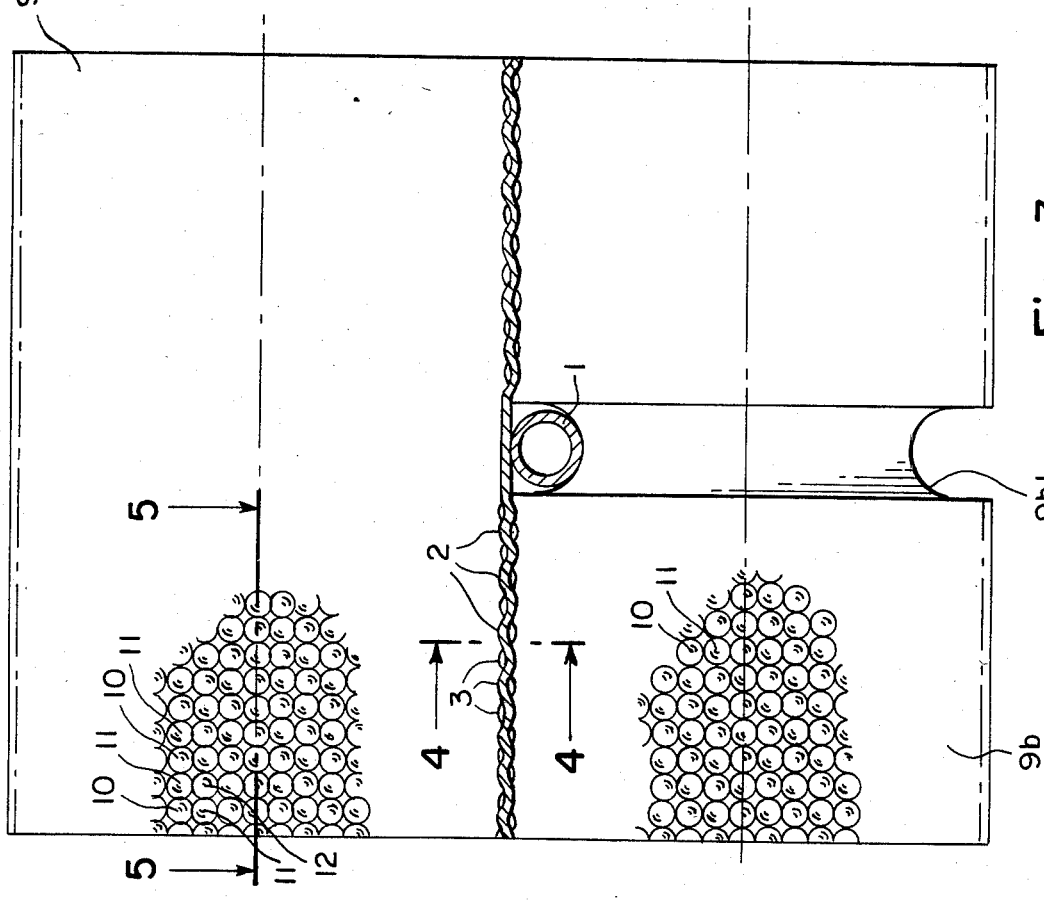
FIG. 3 is a sectional view taken along the line 3—3 of FIG. 2, showing the deformation rollers in elevation in substantially actual size and with the surface of the rollers being illustrated with their surface formations only partly for ease of illustration.

FIG. 2 schematically shows a method for the production of the heat exchanger element shown in FIG. 1. The copper tube 1 is fed continuously in the direction of the arrow and the metal strip 2 fed from the supply roll 7 is brought to the tube 1 and tangentially welded to it by the tungsten/inert gas welding device 8 by through-welding through the metal plate 2. After the welding station 8 the heat exchange element passes through the pair of die-like rollers 9a and 9b each having a plurality of uniformly rounded dome elevations 10 separated by rounded valleys (recesses) 11, which produce the alternating dimples 3 in the metal plate 2, the region 4 (FIG. 1) remaining flat and free of the dimples 3. Both rollers 9a and 9b cold-work the metal plate 2 from above and below at the same time. The two rollers 9a and 9b mesh with each other like gear wheels with clearance substantially equal to the thickness of the metal plate 2 therebetween. The bottom roller 9a has a circumferentially extending groove 9b1 to receive the copper tube 1. The upper roller 9b is formed with a cylindrical central region without the dome elevations and valleys above the flat mid-portion region 4 of the plate 2. The heat exchanger elements (FIG. 1) can be cut to desired lengths at a position to the right in FIG. 2 beyond the rollers 9a and 9b.

While the present invention has been described by way of illustrative embodiments, it is to be understood that the invention is not limited thereto.

I claim:

1. A heat exchanger element formed by a method of making a heat exchanger element comprising the steps of
   continuously feeding a metal tube,
   continuously feeding a metal sheet having longitudinal edges towards the continuously fed metal tube such that the tube is longitudinally centrally between the longitudinal edges of the metal sheet, the width of the metal sheet being greater than the cross sectional dimension of the tube,
   metalurgically connecting the metal sheet to the metal tube by through-welding so as to form a heat exchange element, the metal sheet being welded at a line of contact to the metal tube centrally between the longitudinal edges of the sheet,
   plastically deforming the longitudinal deformation regions of the sheet along both lateral sides of the tube respectively between the longitudinal edges of the sheet leaving a central longitudinal undeformed region of the sheet in the vicinity of the tube, by passing the heat exchange element through a pair of deforming rollers which deform the sheet to form the dimple-shaped plastic deformations in the sheet at the deformation regions, the dimples being formed in the surface of the sheet extending from opposite sides, the dimples being shaped in the form of substantially spherical segments, with the depth of the dimples, measured from an undeformed plane of the sheet, being substantially between 0.1 and 0.7 mm and the radius of curvature of the spherical segments being substantially between 0.3 and 4 mm, and
   transversely cutting the sheet and tube to size to form the heat exchanger element.

2. The heat exchanger as set forth in claim 1, wherein the dimples are formed in a predetermined number and a predetermined distribution such that the sheet has an undulated wave course in a cross-section of the sheet taken in the longitudinal direction of the tube through points of greatest depth of the dimples.

3. The heat exchanger as set forth in claim 1, wherein the dimples are formed in a predetermined number and a predetermined distribution such that the sheet has an undulated wave course in a cross-section of the sheet taken in the transverse direction of the tube through points of greatest depth of the dimples.

4. The heat exchanger as set forth in claim 1, wherein the dimples are formed in a predetermined number and every predetermined distribution such that the sheet has an undulated wave course in every cross-section of the sheet taken in the longitudinal direction of the tube through points of greatest depth of the dimples.

5. The heat exchanger as set forth in claim 1, wherein the sheet has an undulated wave course in every cross-section of the sheet through the dimples.

6. The heat exchanger in accordance with claim 1, wherein
said dimples are alternatingly uniformly distributed as elevations and depressions on both surfaces of the sheet, respectively.

7. The heat exchanger as set forth in claim 1, wherein the thickness of the metal sheet is less than 0.25 mm.

8. A method of making a heat exchanger element comprising the steps of
continuously feeding a metal tube,
continuously feeding a metal sheet having longitudinal edges towards the continuously fed metal tube such that the tube is longitudinally centrally between the longitudinal edges of the metal sheet, the width of the metal sheet being greater than the cross sectional dimension of the tube,
metalurgically connecting the metal sheet to the metal tube by through-welding so as to form a heat exchange element, the metal sheet being welded at a line of contact to the metal tube centrally between the longitudinal edges of the sheet,
plastically deforming the longitudinal deformation regions of the sheet along both lateral sides of the tube respectively between the longitudinal edges of the sheet leaving a central longitudinal undeformed region of the sheet in the vicinity of the tube, by passing the heat exchange element through a pair of deforming rollers which deform the sheet to form the dimple-shaped plastic deformations in the sheet at the deformation regions, the dimples being formed in the surface of the sheet extending from opposite sides, the dimples being shaped in the form of substantially spherical segments, with the depth of the dimples, measured from an undeformed plane of the sheet, being substantially between 0.1 and 0.7 mm and the radius of curvature of the spherical segments being substantially between 0.3 and 4 mm.

9. The method as set forth in claim 8, wherein the deforming rollers are formed with dome elevations and recesses to form the dimple-shaped plastic deformations.

10. The method as set forth in claim 9, wherein the deforming rollers form the dimple-shaped plastic deformations in opposite surfaces of the strip.

11. The method as set forth in claim 8, wherein the deforming rollers respectively are formed with substantially complementary uniformly alternating dome elevations and recess to form the dimple-shaped plastic deformations.

12. The method as set forth in claim 8, wherein the step of plastically deforming the longitudinal deformation regions of the sheet is performed by cold-working said metal sheet with a pressure die action by said deforming rollers.

13. The heat exchanger as set forth in claim 7, wherein
the thickness of the metal sheet is between 0.15 to 0.18 mm.

14. The heat exchanger as set forth in claim 13, wherein
the radius of curvature of the spherical segments is about 3.5 mm, and
the spacing between adjacent of said dimples is between 5 mm and 12 mm.

15. The heat exchanger as set forth in claim 14, wherein
the spacing between said adjacent dimples is approximately 9 mm, with the distance in the longitudinal and transverse directions being the same.

16. The method as set forth in claim 8, further comprising the step of
transversely cutting the sheet and tube to size to form the heat exchanger elements.

* * * * *